(12) United States Patent
Park et al.

(10) Patent No.: US 10,663,406 B2
(45) Date of Patent: May 26, 2020

(54) STRAW INSPECTION APPARATUS

(71) Applicant: P&S TECHNOLOGY CO., LTD., Gyeonggi-Do (KR)

(72) Inventors: Won Jae Park, Gyeonggi-Do (KR); Jong Sik Park, Gyeonggi-Do (KR)

(73) Assignee: P&S TECHNOLOGY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/484,958

(22) PCT Filed: Feb. 8, 2018

(86) PCT No.: PCT/KR2018/001723
§ 371 (c)(1),
(2) Date: Oct. 2, 2019

(87) PCT Pub. No.: WO2018/147664
PCT Pub. Date: Aug. 16, 2018

(65) Prior Publication Data
US 2020/0041421 A1    Feb. 6, 2020

(30) Foreign Application Priority Data

Feb. 9, 2017 (KR) .......................... 10-2017-0018191

(51) Int. Cl.
*G01N 21/95* (2006.01)
*G01N 21/88* (2006.01)

(52) U.S. Cl.
CPC ............. *G01N 21/95* (2013.01); *G01N 21/88* (2013.01); *G01N 21/8851* (2013.01); *G01N 2021/8887* (2013.01)

(58) Field of Classification Search
CPC .... G01N 21/88; G01N 21/8851; G01N 21/95; G01N 2021/8887; G01N 22/02;
(Continued)

(56) References Cited

U.S. PATENT DOCUMENTS 3,737,219 A * 6/1973 Jorgensen ............ G03D 15/043
352/129
4,384,441 A * 5/1983 Maruyama ................ B65B 9/04
53/553
(Continued)

FOREIGN PATENT DOCUMENTS

EP          0033302 A1 *  8/1981  ............. B65D 77/28
JP       2017-001698         1/2017
(Continued)

*Primary Examiner* — Christina A Riddle
(74) *Attorney, Agent, or Firm* — Bacon & Thomas, PLLC (57) ABSTRACT

A straw inspection apparatus for inspecting whether or not a straw sheet is defective comprises: a main body for guiding the transfer of a straw sheet; a driving unit for transferring the straw sheet; a first inspection module for inspecting whether or not foreign materials are present in the straw sheet moving in the main body; a second inspection module for inspecting the exterior of the straw sheet; a controller for determining whether or not the straw sheet is defective based on the inspection results of the first inspection module and the second inspection module; and a cutting unit for separating the straw sheet which is determined to be defective.

6 Claims, 7 Drawing Sheets

(58) Field of Classification Search
CPC ............. G01N 21/00; G01N 2021/845; G01N 2021/952; G01N 21/86; G01N 21/8854; G01N 21/89; G01N 21/8903; G01N 21/94; G01N 2021/8645; G01N 2021/8654; G01N 2021/8841; G01N 2021/8854; G01N 2021/8858; G01N 2021/8861; G01N 2021/8864; G01N 2021/8867; G01N 2021/889; G01N 2021/8893; G01N 2021/8909; B65D 77/28
USPC .......... 356/237.1–241.6, 429–430, 625–640; 264/406, 40.1; 53/44, 444, 450, 461–466, 53/52–58, 499, 500, 503, 504, 67–74, 53/553–555
See application file for complete search history.

(56) References Cited

U.S. PATENT DOCUMENTS 5,979,142 A * 11/1999 Kraft .................... B65B 61/205
53/410
2010/0165333 A1* 7/2010 Ohashi ................. B65H 37/002
356/239.2

FOREIGN PATENT DOCUMENTS

KR 20070105000 A * 10/2007
KR 10-1526310 B1 6/2015

* cited by examiner

STRAW INSPECTION APPARATUS

FIELD OF THE INVENTION

The present invention relates to a straw inspection apparatus, and more particularly, to a straw inspection apparatus capable of accurately inspecting a defect of a straw sheet packaging straws, such as a foreign material in the straw sheet, damage of the straw sheet or the like.

BACKGROUND OF THE INVENTION

In general, a straw is used for drinking beverage such as juice or milk, and is packaged with a cover (vinyl cover) for the sake of hygiene.

When packaging straws, two strip-shaped films are automatically and continuously supplied while straws are consecutively placed to be spaced apart from each other between the two films. Then, the overlapped films between the adjacent straws are welded to package the straws.

The straw sheet (package) is inspected for defects of the straw sheet prior to shipment.

Conventionally, since inspection of the straw sheet for defects (foreign material, damage, etc.) is performed manually, the inspection work is very troublesome and inconvenient. In particular, it is difficult to accurately check fine foreign material included in the straw sheet, the size of the straw sheet and sealing defects of the straw sheet through the manual work. Further, inspection errors may occur depending on the skill of an inspector, and thus reliability of the inspection may be decreased.

Therefore, there is needed a measure for accurately and quickly inspecting defects of a straw sheet packaging straws.

SUMMARY OF THE INVENTION

In view of the above, the present invention provides a straw inspection apparatus capable of accurately and quickly inspecting defects of a straw sheet packaging straws.

In accordance with a first aspect of the present disclosure, there is provided a straw inspection apparatus comprising: a main body configured to guide a movement of a straw sheet; a driving unit configured to move the straw sheet; a first inspection module configured to inspect whether any foreign material exists in the straw sheet moving along the main body; a second inspection module configured to inspect an appearance of the straw sheet; a controller configured to determine whether the straw sheet has a defective portion based on inspection results of the first inspection module and the second inspection module; and a cutting unit configured to remove the defective portion of the straw sheet.

The driving unit may include: a driving motor mounted at the main body; a rotary roller having seating grooves formed on an outer surface thereof, a center portion of the rotary roller being connected to a driving shaft of the driving motor; a drive piece having a curved surface for allowing the straws in the straw sheet to closely contact with the seating grooves of the rotary roller; and a guide roller for guiding the straw sheet to the rotary roller to apply a tension on the straw sheet.

The main body may include: a case to which the first inspection module, the second inspection module and the cutting unit are mounted; a plurality of sheet guides arranged on the case to guide the movement of the straw sheet; and a door for opening and closing an interior space of the case.

The first inspection module may include: a first foreign material inspector configured to photograph an upper surface of the straw sheet and perform a foreign material inspection on the upper surface of the straw sheet; a first backlight provided below the first foreign material inspector to face the first foreign material inspector; a second foreign material inspector configured to photograph a lower surface of the straw sheet from below the straw sheet and perform a foreign material inspection on the lower surface of the straw sheet; and a second backlight provided above the second foreign material inspector to face the second foreign material inspector.

The second inspection module may include: a damage inspector configured to photograph a packaging state of the straw sheet from above the straw sheet; a damage-inspection backlight provided below the damage inspector to face the damage inspector; a dimension inspector configured to inspect dimensions of the straw sheet from above the straw sheet; and a dimension-inspection backlight provided below the dimension inspector to face the dimension inspector.

The cutting unit may include: a base on which the straw sheet is placed, the base having recesses in which straws in the straw sheet are seated; a cutter for cutting the defective portion of the straw sheet; and a connection unit for connecting the remaining portions of the straw sheet from which the defective portion is removed.

The straw sheet may comprise a plurality of straws, and a vinyl cover wrapping and packaging the straws that are arranged spaced apart from each other.

Effect of the Invention

In accordance with the embodiment of the present invention, it is possible to accurately inspect a defect of a straw sheet packaging straws, e.g., whether any foreign material exists in the straw sheet or whether the straw sheet is damaged.

In addition, it is possible to quickly remove the defective portion of the straw sheet determined to be defective and connect the remaining normal straw sheets in consideration of the moving distance of the straw sheet and the position of the inspector.

DETAILED DESCRIPTION OF THE EMBODIMENTS

Hereinafter, configurations and operations of embodiments will be described in detail with reference to the accompanying drawings. The following description is one of various patentable aspects of the present disclosure and may form a part of the detailed description of the present disclosure. However, in describing the present disclosure, detailed descriptions of known configurations or functions that make the present disclosure obscure may be omitted.

The present invention may be modified and include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives that are included in the spirit and scope of the present disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components. Specific terms in the present disclosure are used simply to describe specific embodiments without limiting the present disclosure. An expression used in the singular encompasses the expression of the plural, unless it has a clearly different meaning in the context.

Hereinafter, an embodiment of the present invention will be described in detail with reference to the accompanying drawings.

Figure 1:
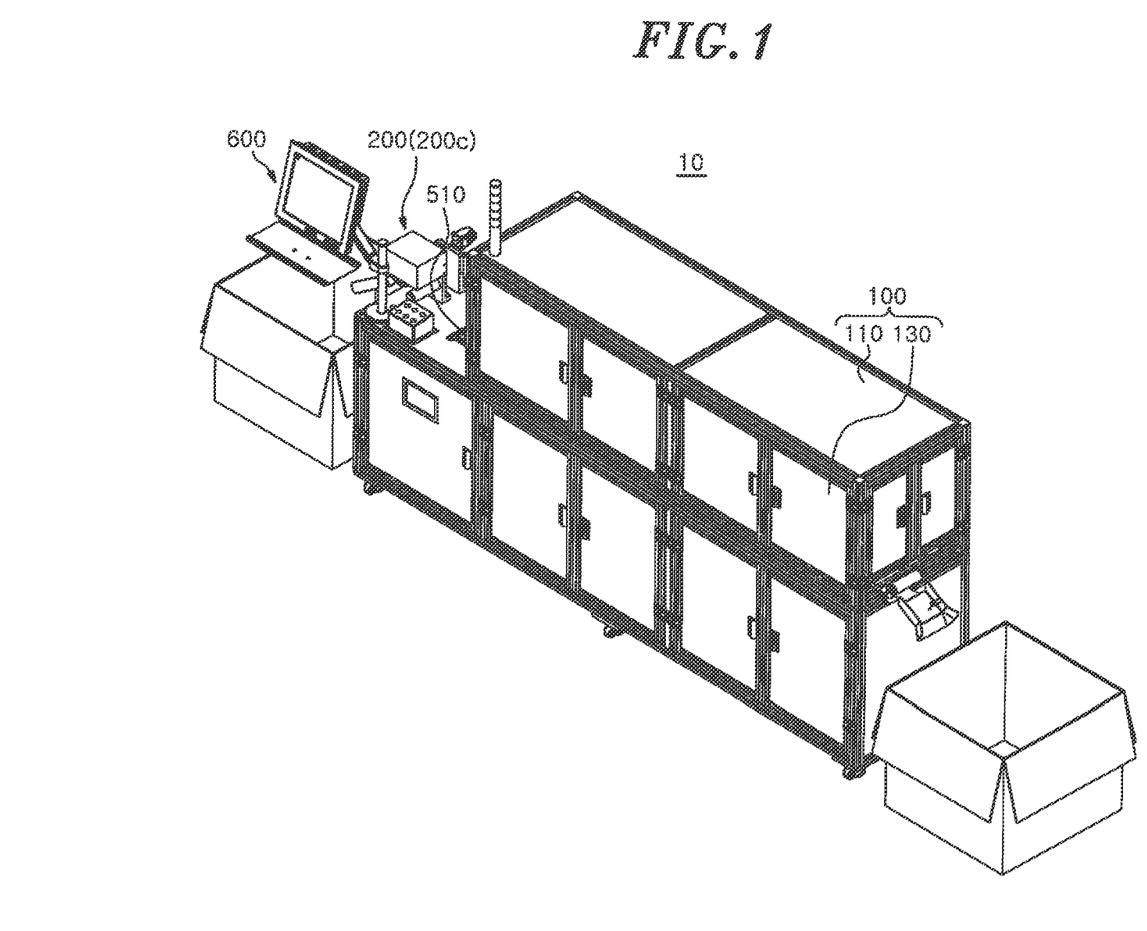
FIG. 1 is a perspective view showing a straw inspection apparatus according to an embodiment of the present invention.
Figure 2:
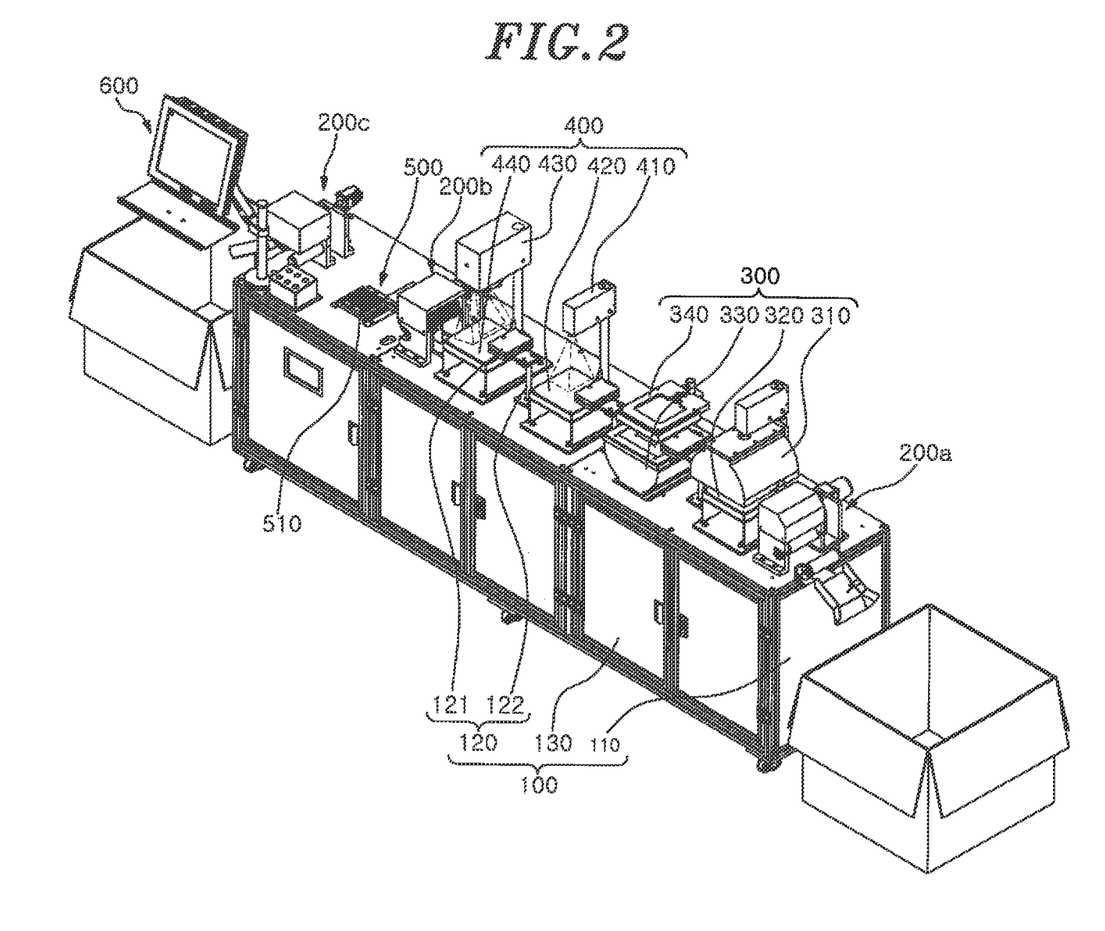
FIG. 2 is a perspective view showing major parts of the straw inspection apparatus according to the embodiment of the present invention.
Figure 3:
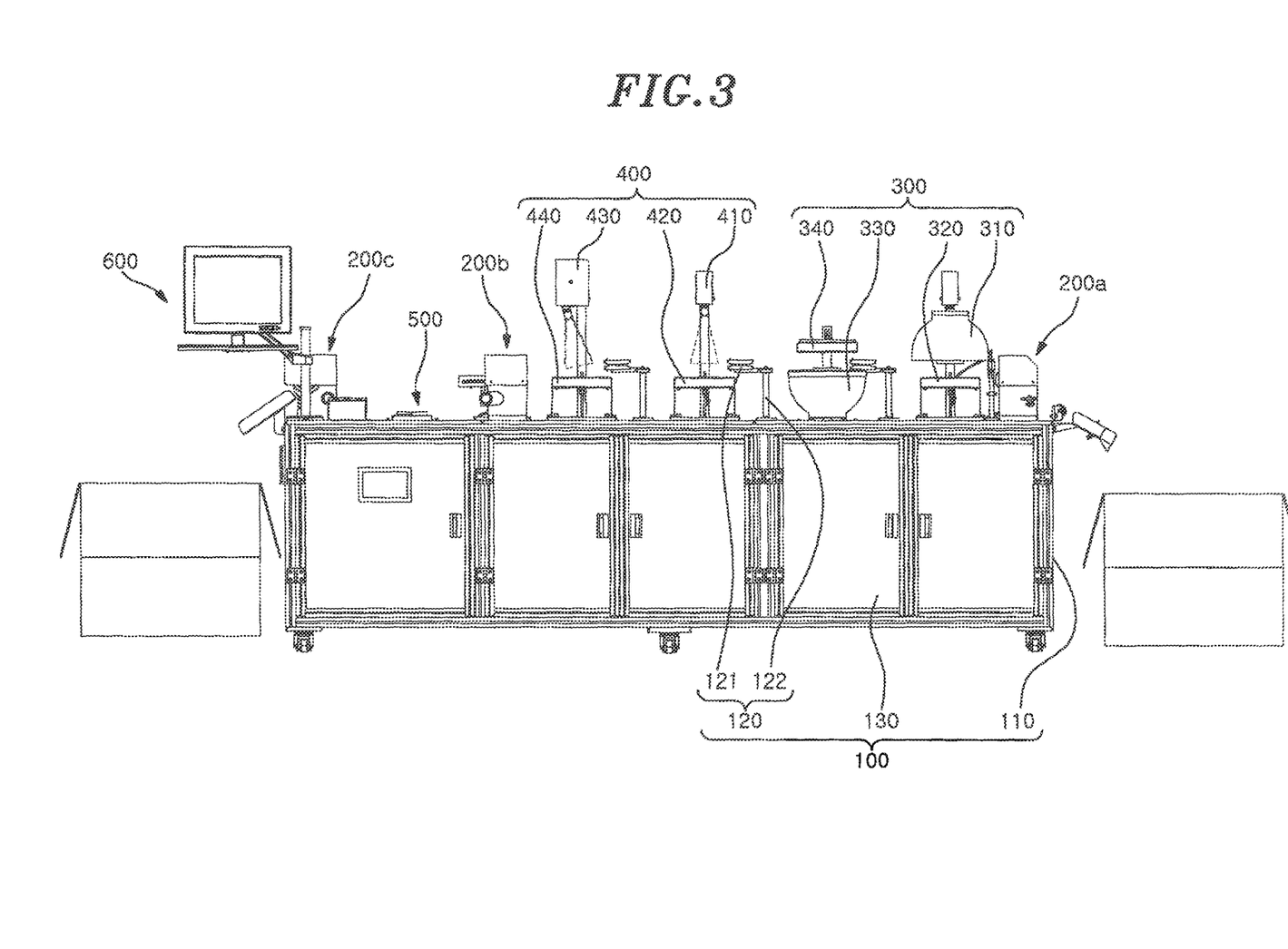
FIG. 3 is a side view showing the major parts of the straw inspection apparatus according to the embodiment of the present invention.

FIG. 1 is a perspective view showing a straw inspection apparatus according to an embodiment of the present invention, FIG. 2 is a perspective view showing major parts of the straw inspection apparatus according to the embodiment of the present invention, and FIG. 3 is a side view showing the major parts of the straw inspection apparatus according to the embodiment of the present invention.

As shown in FIGS. 1 to 3, a straw inspection apparatus 10 according to an embodiment of the present invention includes a main body 100, a driving unit 200, a first inspection module 300, a second inspection module 400, a controller 600, and a cutting unit 500. The straw inspection apparatus 10 can determine whether the straw sheet S has a defective portion and remove the defective portion of the straw sheet S that is determined to be defective. The straw sheet S may be provided in a form of a wrapping sheet in which a plurality of straws T that are arranged spaced apart from each other are wrapped with a vinyl cover C.

Specifically, the main body 100 is a housing that provides the overall appearance and support structure of the straw inspection apparatus, and serves to guide the movement of the straw sheet S.

To this end, the main body 100 includes a case 110 to which the main components constituting the straw inspection apparatus, e.g., the first inspection module 300, the second inspection module 400, the driving unit 200, the cutting unit 500 and the controller 600, are mounted, a plurality of sheet guides 120 arranged on the case 110 to be spaced apart from each other in the longitudinal direction of the case 110 to guide the movement of the straw sheet S, and a door 130 for opening and closing the interior space of the case 110.

The sheet guides 120 include guide bars 122 spaced apart in the longitudinal direction of the case 110 and guide pieces 121 provided above the respective guide bars 122 to guide the movement of the straw sheet S.

By the sheet guides 120 spaced apart in the longitudinal direction of the case 110, the straw sheet S moving along the case 110 in the longitudinal direction of the case 110 can be stably guided.

Further, a position sensor (not shown) for detecting the position of the straw sheet S may be provided at each of the sheet guides 120.

The position sensor serves to detect the straw sheet S passing through each of the sheet guides 120 positioned at different points of the case 110, and transmit the overall movement information of the straw sheet S moving along the longitudinal direction of the case 110 to the controller 600.

In addition, the case 110 may be provided with an air tube (not shown) for removing dust on backlights (e.g., a first and a second backlight, and a damage-inspection and a dimension-inspection backlight). The air tube can absorb or blow dust by providing air for dust removal to the backlight.

In the present embodiment, some parts of the straw inspection apparatus (the first inspection module, the second inspection module and the driving unit) are provided in the internal space of the case 110, but the remaining parts of the straw inspection apparatus (the cutting unit, the controller, etc.) may also be installed in the internal space of the case 110. Alternatively, the first inspection module, the second inspection module and the driving unit may be provided at the outside of the case 110 to be exposed.

The driving unit 200 is configured to move the straw sheet S along the longitudinal direction of the case 110, and includes a first driving unit 200a installed at a front portion of the case 110, a second driving unit 200b installed at a middle portion of the case 110, and a third driving unit 200c installed at a rear portion of the case 110.

The first driving unit 200a is positioned at the front portion (the right side in FIG. 1) of the case 110 to introduce the straw sheet S provided from the outside into the main body 100. The second driving unit 200b is positioned at the middle portion of the case 110 to provide the cutting unit 500 with the straw sheet S received from the first driving unit 200a. The third driving unit 200c is located at the rear portion (the left side in FIG. 1) of the case 110 to draw out the straw sheet S passing through the cutting unit 500 to the outside of the main body 100.

The first inspection module 300 can inspect whether any foreign material exists in the straw sheet S by inspecting the straw sheet S moving in the longitudinal direction of the main body 100.

The first inspection module 300 includes a first foreign material inspector 310 configured to photograph an upper surface of the straw sheet S from above the straw sheet S and perform a foreign material inspection on the upper surface of the straw sheet S, a first backlight 320 provided below the first foreign material inspector 310 with the straw sheet S therebetween to face the first foreign material inspector 310, a second foreign material inspector 330 configured to photograph a lower surface of the straw sheet S from below the straw sheet S and perform a foreign material inspection on the lower surface of the straw sheet S, and a second backlight 340 provided above the second foreign material inspector 330 with the straw sheet S therebetween to face the second foreign material inspector 330.

The first backlight 320 and the second backlight 340 may provide illumination having a brightness higher than those of a damage-inspection backlight 420 and a dimension-inspection backlight 440 of the second inspection module 400 that inspects the appearance of the straw sheet S. This is because it may be difficult to identify the foreign material in the straw sheet S when the low brightness illumination is provided to the straw sheet S during the foreign material inspection of the straw sheet S.

The second inspection module 400 can inspect the appearance of the straw sheet S that has been subjected to the foreign material inspection by the first inspection module 300. For example, the second inspection module 400 can inspect the packaging state of the straw sheet S and the dimensions of the straw sheet S.

The second inspection module 400 includes a damage inspector 410 configured to photograph a packaging state of the straw sheet S from above the straw sheet S and inspect whether the straw sheet S is damaged, a damage-inspection backlight 420 provided below the damage inspector 410 with the straw sheet S therebetween to face the damage inspector 410, a dimension inspector 430 configured to inspect dimensions of the straw sheet S from above the straw sheet S, and a dimension-inspection backlight 420 provided below the dimension inspector 430 with the straw sheet S therebetween to face the dimension inspector 430.

The damage-inspection backlight 420 and the dimension backlight 440 may provide illumination having a brightness lower than those of the first backlight 320 and the second backlight 340 of the first inspection module 300 that inspects a foreign material in the straw sheet S. This is because it may be difficult to secure images of the straw sheet S for inspecting damages and dimensions of the straw sheet S when the high brightness illumination is provided to the straw sheet S during the damage and dimension inspection of the straw sheet S.

A grid sheet (not shown) may be provided on a surface of the damage-inspection backlight 420. Since the grid sheet includes a grid pattern, when the straw sheet S is inspected for damage by the damage inspector 410, the portion of the vinyl cover of the straw sheet S may appear bright by the illumination of the damaged backlight 420 and the grid of the grid sheet may appear on the non-vinyl portion of the straw sheet S.

Therefore, when inspecting whether the straw sheet S is damaged, it is possible to clearly confirm the damage of the straw sheet S such as tearing or partial breakage of the straw sheet S.

Figure 4:
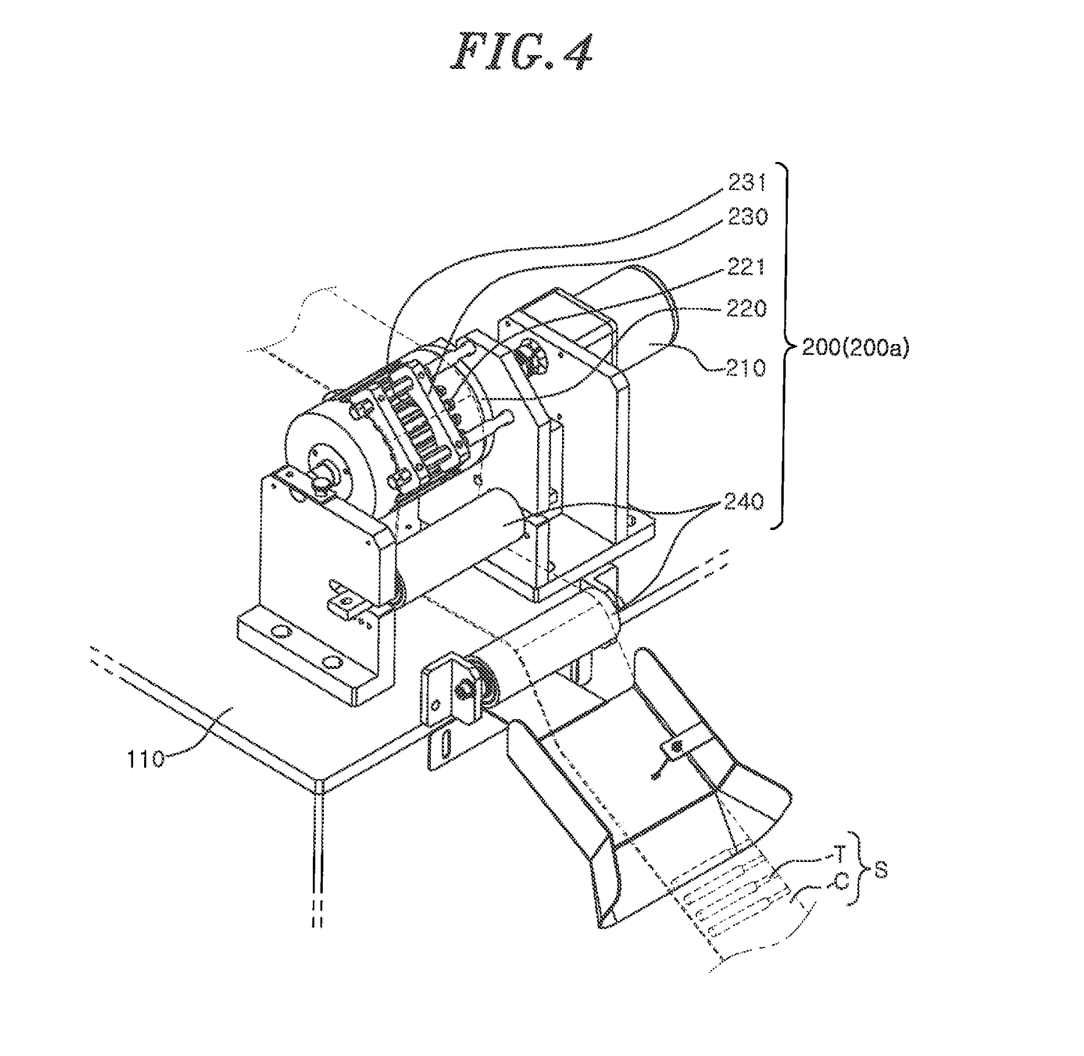
FIG. 4 is a perspective view showing a driving unit of the straw inspection apparatus according to the embodiment of the present invention.

FIG. 4 is a perspective view showing a driving unit of the straw inspection apparatus according to an embodiment of the present invention.

As shown in FIG. 4, each of the driving units 200 includes a driving motor 210 mounted at the main body 100, a rotary roller 220 having seating grooves 221 formed on the outer surface thereof, a center portion of the rotary roller 220 being connected to a driving shaft of the driving motor 210, a drive piece 230 having a curved surface 231 for allowing the straws of the straw sheet S to closely contact with the seating grooves 221 of the rotary roller 220, and a guide roller 240 for guiding the straw sheet S to the rotary roller 220 to apply a tension on the straw sheet S.

For example, in a state in which the straws T in the straw sheet S are seated in the seating grooves 221 of the rotary roller 220, when the rotary roller 220 is rotated by the rotation of the driving motor 210, the straw sheet S is pulled in one direction by the rotation of the rotary roller 220.

At this time, the straw sheet S introduced into the first driving unit 200a is guided to the rotary roller 220 by the guide roller 240, and the straws T in the straw sheet S are consecutively seated in the seating grooves 221 of the rotary roller 220 by the curved surface 231 of the drive piece 230 and then moved to the first inspection module 300.

Figure 5:
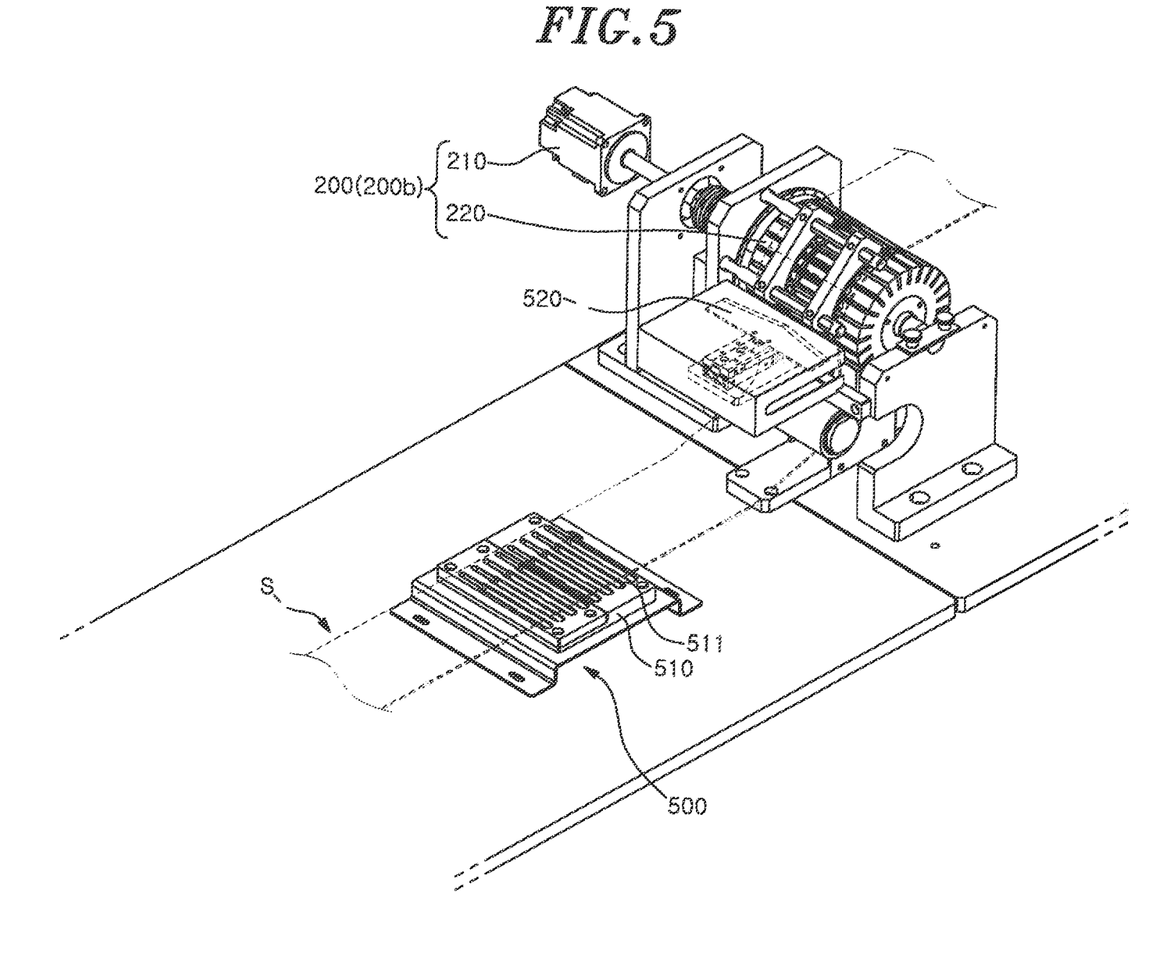
FIG. 5 is a perspective view showing a cutting unit of the straw inspection apparatus according to the embodiment of the present invention.
Figure 6:
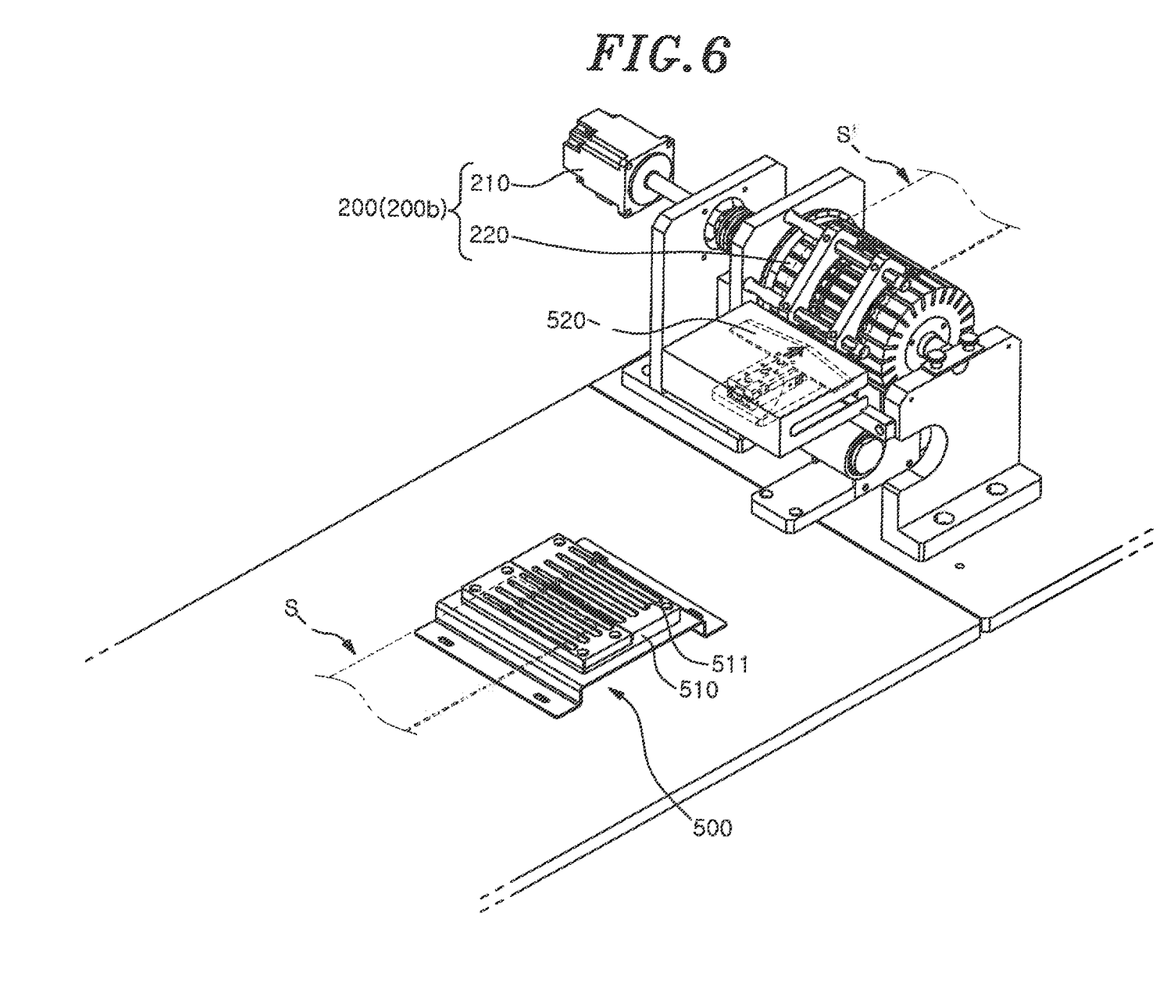
FIG. 6 shows a state where the straw sheet is cut by the cutting unit of the straw inspection apparatus according to the embodiment of the present invention.
Figure 7:
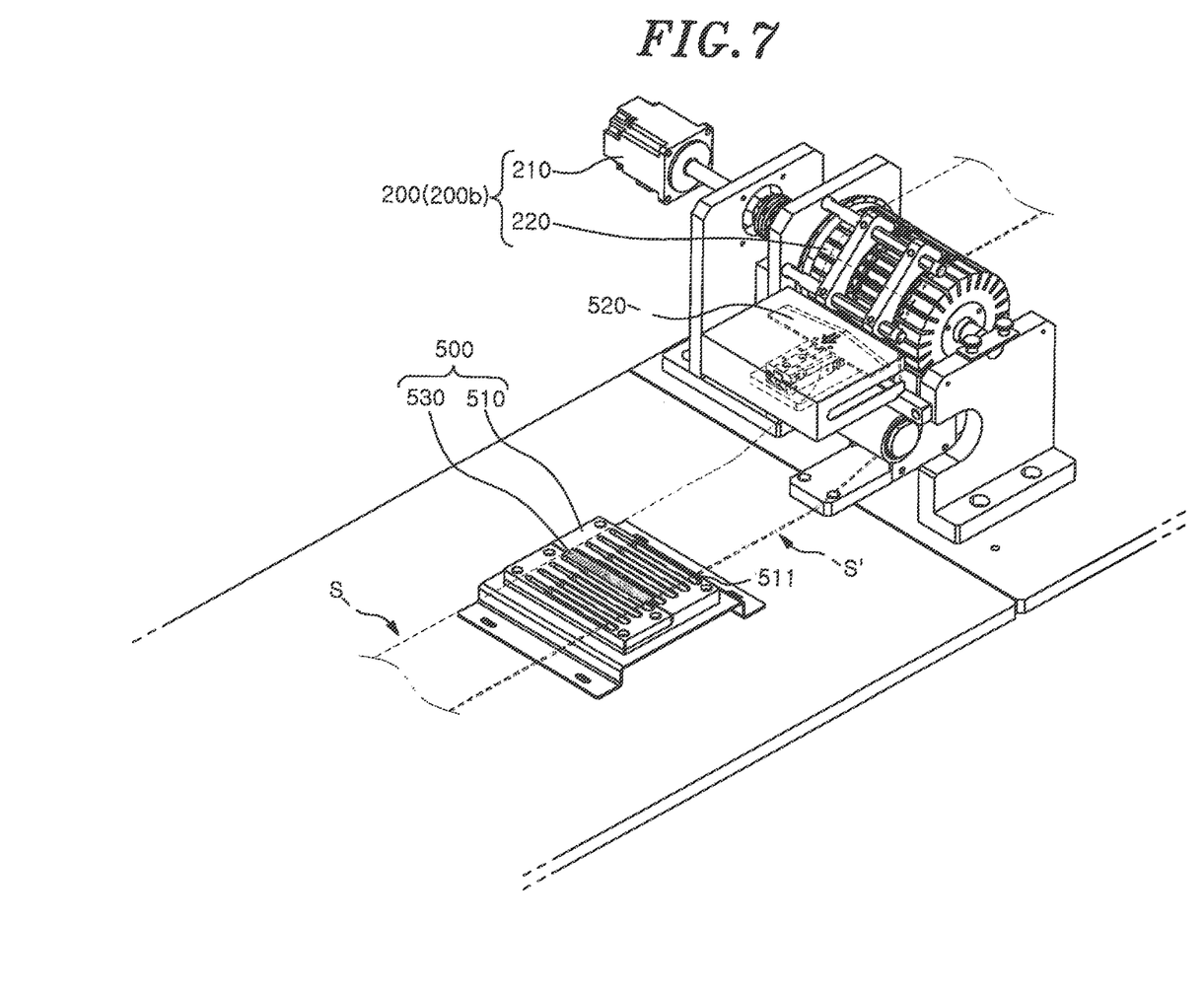
FIG. 7 shows a state where the straw sheet cut by the cutting unit of the straw inspection apparatus according to the embodiment of the present invention is connected again.

FIG. 5 is a perspective view showing a cutting unit of the straw inspection apparatus according to the embodiment of the present invention, FIG. 6 shows a state where the straw sheet is cut by the cutting unit of the straw inspection apparatus according to the embodiment of the present invention, and FIG. 7 shows a state where the straw sheet cut by the cutting unit of the straw inspection apparatus according to the embodiment of the present invention is connected again.

As shown in FIGS. 5 to 7, the cutting unit 500 can remove the defective portion (the portion determined as defective) of the straw sheet S from the entire straw sheet S, and the remaining straw sheets S and S' from which the defective portion is removed can be recombined with each other.

The cutting unit 500 has a base 510 having an upper surface provided with recesses 511 in which the straws in the straw sheet S are seated, and a cutter 520 for cutting the defective portion of the straw sheet S determined as defective, and a connection unit for connecting the remaining portions of the straw sheet S from which the defective portion is removed. As the connection unit, a tape 530 may be used to connect the straw sheets S and S' from which the defective portion is removed.

For example, if it is determined by the controller 600 that a specific portion of the straw sheet S is defective (foreign material existence, damage, dimension error, etc.), as shown in FIG. 6, the controller 600 can control the cutter 520 of the cutting unit 500 to cut the leading end of the defective portion of the straw sheet S. In this case, the user cuts the trailing end of the defective portion of the straw sheet S on the base 510 by using a separate cutter to remove the defective portion from the straw sheet S, and then, as shown in FIG. 7, connect the separated straw sheets S and S' from which the defective portion is removed using the tape 530.

In the present embodiment, there is described that the cutter 520 of the cutting unit 500 cuts only the leading end of the defective portion of the straw sheet S. However, the present invention is not limited to thereto, and depending on the inspection conditions and design environment, the cutter 520 of the cutting unit 500 may cut both the leading end and the trailing end of the defective portion of the straw sheet 3.

The controller 600 controls the driving unit 200, the first inspection module 300, the second inspection module 400, and the cutting unit 500 as a whole. In particular, the controller 600 receives an inspection result for the straw sheet S from the first inspection module 300 and the second inspection module 400, and determines whether the straw sheet S has a defective portion based on the received inspection result.

For example, the controller 600 determines whether the straw sheet S has a defective portion based on the inspection result received from the first inspection module 300 and the second inspection module 400. If it is determined that a specific portion of the straw sheet S is defective, the controller 600 can determine accurate position of the defective portion of the straw sheet S through the position sensor provided to the sheet guide 120 and an encoder installed at the driving unit 200.

Then, when the defective portion of the straw sheet S is moved to the point where the cutting unit 500 is located, the controller 600 sends an operation signal for cutting the leading end of the defective portion of the straw sheet S to the cutter 520 of the cutting unit 500.

Hereinafter, an operation of the straw inspection apparatus according to an embodiment of the present invention having the configuration as described above will be described.

First, an externally provided straw sheet S is introduced into the main body 100 by the operation of the first driving unit 200*a* and the second driving unit 200*b*. For example, the straw sheet S introduced into the main body 100 is guided to the rotary roller 220 by the guide roller 240. At this time, the straws T in the straw sheet S are consecutively seated in the seat grooves 221 of the rotary roller 220 and the straw sheet S is then moved to the first inspection module 300.

The straw sheet S moved to the first inspection module 300 is subjected to the foreign material inspection with respect to the upper and the lower surface of the straw sheet S through the first foreign material inspector 310 and the second foreign material inspector 330 of the first inspection module 300, and then moved to the second inspection module 400.

The straw sheet S moved to the second inspection module 400 is inspected for the packaging state and the dimensions by the damage inspector 410 and the dimension inspector 430 of the second inspection module 400, and then moved to the cutting unit 500.

If a defective portion of the straw sheet S is detected, the cutting unit 500 cuts the leading end of the defective portion of the straw sheet S. That is, when the defective portion of the straw sheet 2 is moved to the point where the cutting unit 500 is located, the cutting unit 500 cuts the leading end of the defective portion of the straw sheet S in response to the operation signal of the controller 600. In this case, the user can cut the trailing end of the defective portion by using a separate cutter and then connect the straw sheets S and S' from which the defective portion is removed using the tape 530.

Thereafter, the connected straw sheets S and S' from which the defective portion is removed can be discharged from the main body 100 by the operation of the third driving unit 200*c*.

As described above, the straw inspection apparatus according to the present invention can accurately inspect whether the straw sheet packaging straws has a defective portion, for example, whether any foreign material exists in the straw sheet and whether the appearance of the straw sheet is damaged, and it is possible to quickly remove the defective portion of the straw sheet and interconnect the remaining normal portions of the straw sheet in consideration of the moving distance of the straw sheet, the positions of the inspectors and the like.

While the present disclosure has been shown and described with respect to the embodiments, it will be understood by those skilled in the art that various changes and modifications may be made without departing from the scope of the present disclosure as defined in the following claims.

What is claimed is:

1. A straw inspection apparatus comprising:
a main body configured to guide a movement of a straw sheet;
a driving unit configured to move the straw sheet;
a first inspection module configured to inspect whether any foreign material exists in the straw sheet moving along the main body;
a second inspection module configured to inspect an appearance of the straw sheet;
a controller configured to determine whether the straw sheet has a defective portion based on inspection results of the first inspection module and the second inspection module; and
a cutting unit configured to remove the defective portion of the straw sheet,
wherein the cutting unit includes:
a base on which the straw sheet is placed, the base having recesses in which straws in the straw sheet are seated;
a cutter for cutting the defective portion of the straw sheet; and
a connection unit for connecting the remaining portions of the straw sheet from which the defective portion is removed.

2. The straw inspection apparatus of claim 1, wherein the driving unit includes:
a driving motor mounted at the main body;
a rotary roller having seating grooves formed on an outer surface thereof, a center portion of the rotary roller being connected to a driving shaft of the driving motor;
a drive piece having a curved surface for allowing the straws in the straw sheet to closely contact with the seating grooves of the rotary roller; and
a guide roller for guiding the straw sheet to the rotary roller to apply a tension on the straw sheet.

3. The straw inspection apparatus of claim 1, wherein the main body includes:
a case to which the first inspection module, the second inspection module and the cutting unit are mounted;
a plurality of sheet guides arranged on the case to guide the movement of the straw sheet; and
a door for opening and closing an interior space of the case.

4. The straw inspection apparatus of claim 1, wherein the first inspection module includes:
a first foreign material inspector configured to photograph an upper surface of the straw sheet and perform a foreign material inspection on the upper surface of the straw sheet;
a first backlight provided below the first foreign material inspector to face the first foreign material inspector;
a second foreign material inspector configured to photograph a lower surface of the straw sheet from below the straw sheet and perform a foreign material inspection on the lower surface of the straw sheet; and
a second backlight provided above the second foreign material inspector to face the second foreign material inspector.

5. The straw inspection apparatus of claim 1, wherein the second inspection module includes:
a damage inspector configured to photograph a packaging state of the straw sheet from above the straw sheet;
a damage-inspection backlight provided below the damage inspector to face the damage inspector;
a dimension inspector configured to inspect dimensions of the straw sheet from above the straw sheet; and
a dimension-inspection backlight provided below the dimension inspector to face the dimension inspector.

6. The straw inspection apparatus of claim 1, wherein the straw sheet comprises a plurality of straws, and a vinyl cover wrapping and packaging the straws that are arranged spaced apart from each other.

* * * * *